United States Patent Office 3,070,607
Patented Dec. 25, 1962

3,070,607
THE PROCESS FOR PREPARING MIXED PIPERONYL ACETALS OF ACETALDEHYDE
William F. Barthel, Catonsville, Md., Benjamin H. Alexander, Washington, D.C., and Morton Beroza, Greenbelt, Md., assignors to the United States of America as represented by the Secretary of Agriculture
No Drawing. Filed Apr. 24, 1957, Ser. No. 654,972
1 Claim. (Cl. 260—340.5)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to new compounds comprising mixed piperonyl acetals of acetaldehyde and to a process for producing them. The invention relates further to insecticide compositions containing pyrethrins or pyrethrin-type compounds and these new mixed piperonyl acetals of acetaldehyde as synergists therefor.

Pyrethrins and pyrethrin-type compounds, such as allethrin, are useful because of their quick paralyzing or knockdown action on flies, gnats, mosquitoes, and the like. In use, they are generally mixed with inert carriers because of their high cost. In many cases a synergist is added which has little or no insecticidal property in itself but which increases the action of the pyrethrins or pyrethrin-type compounds and thereby effects a saving in the use of these expensive materials.

According to the invention there are provided mixed piperonyl acetals of acetaldehyde having the general formula

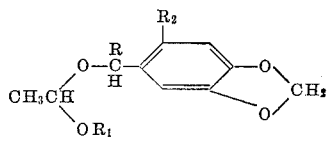

wherein R is hydrogen, methyl, or ethyl; $R_1$ is alkoxyalkyl or polyalkoxyalkyl; and $R_2$ is hydrogen, propyl, propenyl, or allyl.

Compounds having the above structure exhibit unexpected and unusually high synergistic activity, are easy and inexpensive to manufacture, and are soluble in the solvents normally used to dispense pyrethrin-synergist insecticide compositions.

According to this invention, the compounds are prepared by the slow addition of the appropriate piperonyl alcohol to a slight excess of the appropriate vinyl ether ($CH_2=CHOR_1$) to which catalytic amounts of hydrogen chloride gas have been added. After standing overnight, the mixture is taken up in ether, washed several times with aqueous alkali, and finally with a saturated salt solution. The ether solution is dried and the solvent evaporated. The product is distilled for final purification. Yields are 50% or better.

The following table gives chemical data on the aforementioned acetals:

The synergistic results obtained with these compounds are shown in the data in Table II.

Table II

| Compound | Percent mortality in 24 hours | |
|---|---|---|
| | Pyrethrin test solution | Allethrin test solution |
| A | 96 | 84 |
| B | [1] 88 | |
| C | 94 | |
| D | 87 | 89 |
| E | 89 | 75 |

[1] Tested at 0.4 mg./ml. pyrethrins +2 mg./ml. synergist.

In the entomological procedure on which the above data are based, the turntable method was employed, 100 house flies per test being used; and in the pyrethrins and allethrin test solutions used against house flies, refined kerosene was used as the common solvent for the synergist and the respective pyrethrins and allethrin. The pyrethrins and allethrin test solutions each contained a total of 5 mg. of synergist and 0.5 mg. of pyrethrins or allethrin per ml. of solvent unless otherwise noted. The percent mortality after 24 hours using these test solutions is listed in Table II.

As controls, the acetals, when used alone at 5 mg. per ml. of solvent, that is, without added pyrethrins or allethrin, gave a low mortality, usually below 3% after 24 hours.

Pyrethrins alone, that is, without added synergist, gave the following mortalities in 24 hours at the recited concentrations in mg. per ml. of deodorized kerosene solvent:

Table III

| Concentration: | Percent mortality, 24 hrs. |
|---|---|
| 4.0 | 81 |
| 2.0 | 37 |
| 1.0 | 18 |

Allethrin alone, that is, without added synergist, gave the following mortalities of house flies in 24 hours of the recited concentrations in mg. per ml. of deodorized kerosene solvent:

Table IV

| Concentration: | Percent mortality, 24 hrs. |
|---|---|
| 1.0 | 65 |
| 0.5 | 31 |

The proportions of the acetals and the pyrethrins or the pyrethrin-type compounds may be varied over a wide range. The preferred ranges, however, are about from 0.05 to 2% of the synergist to about 0.005 to 1% of the pyrethrins or pyrethrin-type compound. The latter percentage figures refer to active ingredients.

The composition may be formulated with other conventional materials commonly used in the insecticide art, such as carriers, toxic materials and other additives.

Table I

| Compound | Piperonyl acetal wherein | | | Carbon | | Hydrogen | | $n_D^{25}$ | B.P., °C. | Percent yield |
|---|---|---|---|---|---|---|---|---|---|---|
| | R is— | $R_1$ is— | $R_2$ is— | Calc'd | Found | Calc'd | Found | | | |
| A | H | —$CH_2CH_2OCH_2CH_2OC_2H_5$ | H | 61.52 | 61.30 | 7.75 | 7.40 | 1.4941 | 172–180°/0.8 | 70 |
| B | $C_2H_5$ | —$CH_2CH_2OCH_2CH_2OC_2H_5$ | H | 63.27 | 63.52 | 8.26 | 8.29 | 1.4880 | 176–182°/1.5 | 68 |
| C | H | —$CH_2CH_2OCH_2CH_2OC_2H_5$ | —$CH_2CH_2CH_3$ | 64.38 | 64.54 | 8.53 | 8.53 | 1.4950 | 169–195°/0.5 | 50 |
| D | H | —$CH_2CH_2OCH_2CH_2OC_2H_5$ | —CH=CH—$CH_3$ | 64.75 | 64.61 | 8.01 | 8.01 | 1.5136 | 182–209/0.3 | 60 |
| E | H | —$CH_2CH_2OCH_2CH_2OC_2H_5$ | —$CH_2$—CH=$CH_2$ | 64.75 | 63.88 | 8.01 | 7.72 | 1.5022 | 174–210/0.3 | 70 |

What is claimed is:

The process for preparing mixed piperonyl acetals of acetaldehyde having the formula

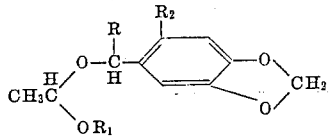

wherein R is selected from the group consisting of hydrogen, methyl, and ethyl, $R_1$ is ethoxyethyl, and $R_2$ is selected from the group consisting of hydrogen, propyl, propenyl, and allyl, which comprises reacting a piperonyl alcohol having the formula

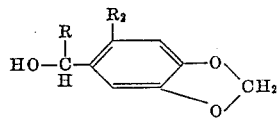

with a vinylether having the formula $$CH_2=CHOR_1$$

in the presence of catalytic amount of hydrogen chloride, R, $R_1$, and $R_2$ having the significance as defined above.

References Cited in the file of this patent
UNITED STATES PATENTS 2,485,681  Wachs ---------------- Oct. 25, 1949
2,493,927  Prill ------------------ Jan. 10, 1950

OTHER REFERENCES

Turner: Methylenedioxyphenyl Synergists for Insecticides, Conn. Agr. Exper. Station Bull. 570, pp. 17–19, April 1953.

Wagner et al.: Synthetic Organic Chem., p. 232, 1953.

Agricultural and Food Chemistry, pp. 49–53, vol. 4, No. 1, January 1956.